United States Patent Office
3,321,214
Patented May 23, 1967

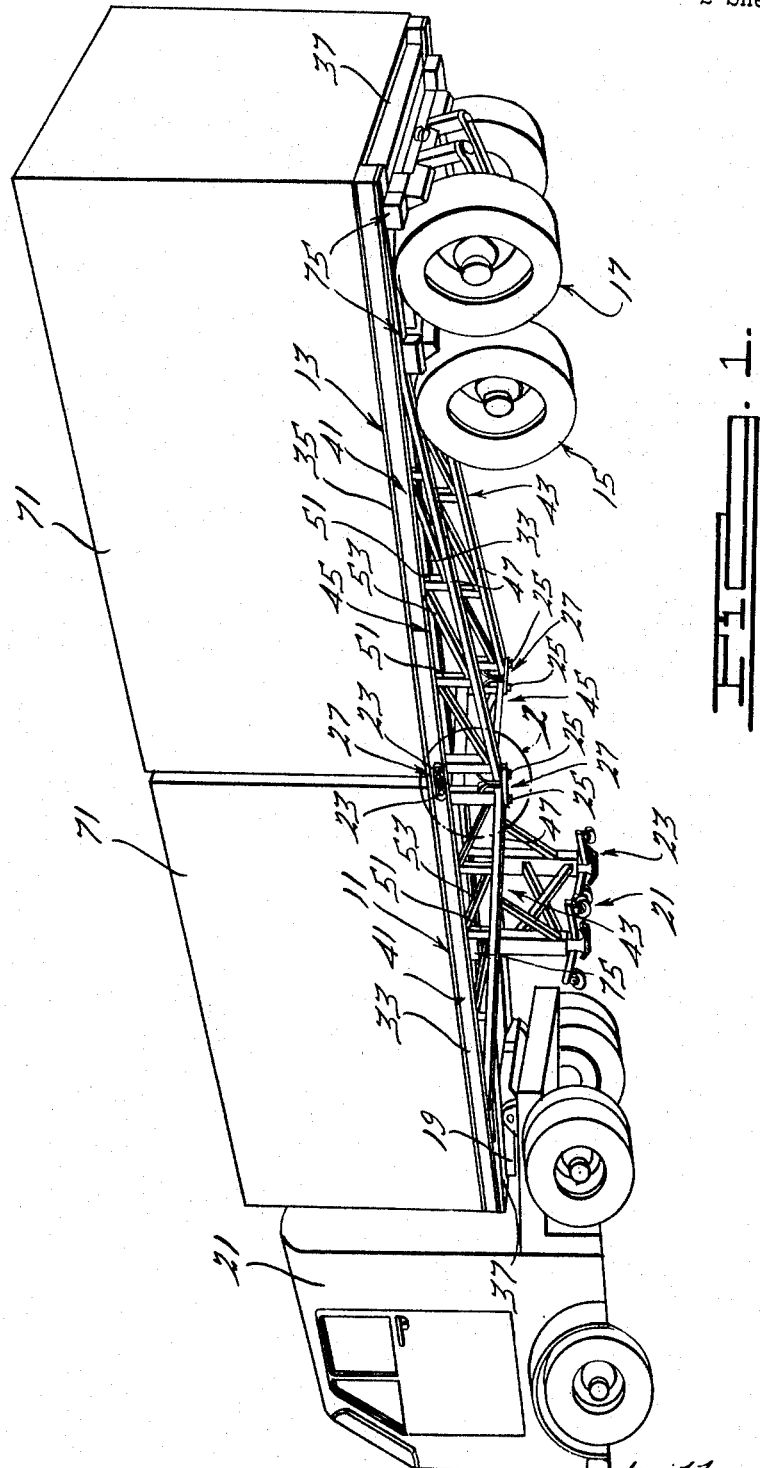

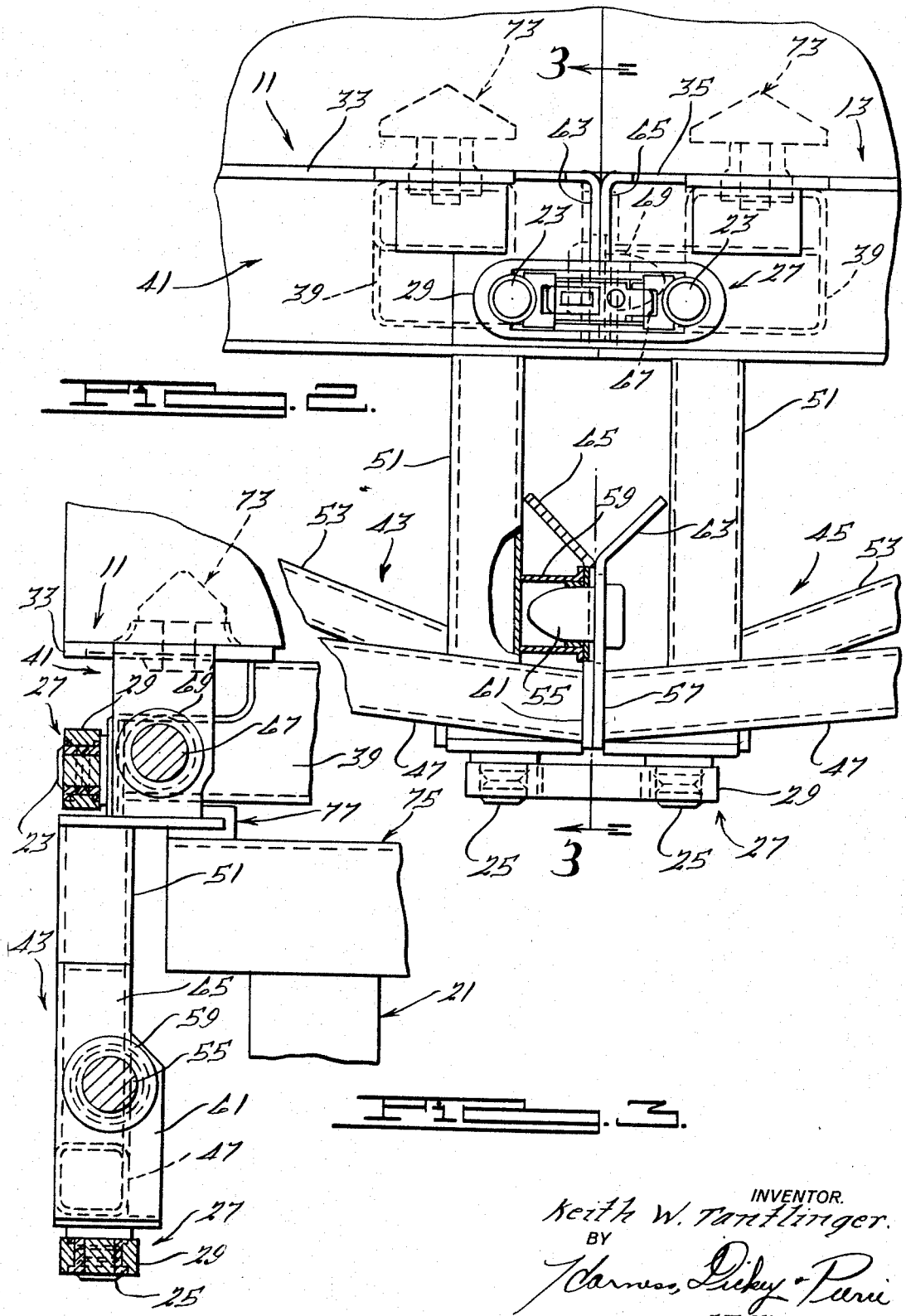

3,321,214
COUPLED TRAILER CHASSIS
Keith W. Tantlinger, Grosse Pointe Shores, Mich., assignor to Fruehauf Corporation, Detroit, Mich., a corporation of Michigan
Filed Nov. 22, 1965, Ser. No. 508,892
5 Claims. (Cl. 280—415)

This invention relates generally to shipping apparatus and particularly to an improved trailer chassis and chassis coupling construction.

It is often desired to couple two trailer chassis in end-to-end relation to form a structurally independent unit that accepts, for example, the fifth wheel of a conventional tractor at one end and one or more conventional wheel bogies at the other end.

One of the problems encountered in this type of construction relates to the forces and resulting stresses imposed on the chassis coupling. Thus, with the unit supported substantially at both ends and unsupported at its middle, the resulting stresses on the unit are greatest at the area of coupling so that the structural requirements of the chassis are most critical at this area. In addition, the coupling srtucture for the abutted chassis is subjected to severe ineritia forces so that it is necessary to provide a chassis and coupling construction adapted to withstand these forces without danger of failure during use.

In constructing this chassis and coupling assembly, it is important to bear in mind existing legal vehicle weight and width limits so that a maximum load can be shipped without any danger of unit failure. Further, the chassis preferably should be constructed to efficiently and effectively hold and support large shipping containers thereon and should lend itself to versatility regarding its suspension system.

Accordingly, main objects of the present invention are an improved trailer chassis and coupling construction therefor which is extremely strong, which is adapted to handle maximum sized shipping containers and which is highly versatile in accommodating vehicle suspension systems.

Further objects include a chassis and coupling construction of the above character which is relatively inexpensive to manufacture, easy to handle and reliable in use.

Other objects and advantages of the present invention will become more apparent from a consideration of the following detailed description and claims taken in conjunction with the drawings in which:

FIGURE 1 is a perspective view of a coupled chassis assembly embodying the present invention shown in secured relation to a conventional tractor;

FIG. 2 is an enlarged view, partly in section, of a portion of FIG. 1 taken within the circle 2 thereof; and FIG. 3 is a sectional view of FIG. 2 taken along the line 3—3 thereof.

Broadly described, the present invention includes a pair of aligned trailer chassis abutted at their rear ends and each having a depending truss means on each side extending to said rear ends, a first pair of parallel pins on each side edge of said chassis adjacent said rear ends thereof, a second pair of parallel pins on the bottom of each said truss means adjacent the rear ends of said chassis, a loop engaging each pair of pins on opposite faces thereof for maintaining the chassis in aligned abutting relation, two pairs of cooperating aligned male and female means on opposite sides of each said chassis at the rear end edges thereof interengaging when said chassis are in aligned abutting relation, said chassis adapted to adjustably receive suspension means along their length.

Referring now more particularly to the drawings, and particularly FIG. 1, a pair of trailer chassis 11, 13 are shown in end-to-end abutting relation so as to form an elongated structurally independent unit for the acceptance of, for example, a pair of conventional wheel bogies 15, 17 at one end and a fifth wheel 19 of a conventional tractor 21 at the other end thereof. A pair of support legs 23, 25 may be provided near the front end of the chassis 11 to support the unit when detached from the tractor fifth wheel 19.

The chassis 11, 13 are each provided with a pair of outwardly extending pins 23, 25 adjacent the side and bottom rear end edges, respectively, and at either side thereof. Only one set of laterally extending pins 23 is shown; however, it will be understood that another set of these pins 23 is provided at the opposite side of the abutted chassis 11, 13 substantially identical to the set illustrated.

Each set of the pins 23, 25 is joined by a tie 27 in the form of a loop 29 that extends about the pins 23, 25 in snug fitting relation so that the loops 29 closely engage outer opposite arcuate faces of each set of pins 23, 25 and hold the chassis 11, 13 in abutting relation (FIGS. 2 and 3). A detailed description of the ties 27 is omitted here, it being understood that they preferably are of the type illustrated and described in detail in the U.S. Patent to K. W. Tantlinger et al., No. 3,086,673, issued Apr. 23, 1963, and owned by the assignee of the present application.

Each of the chassis 11, 13 includes a generally rectangular frame 31 having a pair of parallel side rails 33, 35 interconnected at their front and rear ends by a front and rear bar 37, 39, respectively. As shown, the side rails 33, 35 are generally I-shaped in cross-section forming a recess 41 to receive the lateral pins 23 and the ties 27 so that the latter are wholly within the recesses 41 and the side rails 33, 35 define the width of the unit.

Each of the side rails 33, 35 has a depending truss 43, 45 extending from an intermediate portion to a position adjacent the rear bars 39 thereof. The trusses 43, 45 each includes a generally rectangular cross-sectional tubular member 47 secured to the side rails 33, 35 at its forward end by a strap 49 welded or otherwise suitably fixed thereto and at spaced locations rearwardly thereof by vertical and diagonal struts 51, 53, respectively. The tubular members 47 taper downwardly from their forward ends to their rear ends adjacent the frame rear bars 39, and the struts 51, 53 adjacent the rear bars 39 are correspondingly longer than the other struts. The pins 25 are each secured to a respective one of the tubular members 47 adjacent their lowermost ends. The inertia forces on the coupled chassis unit illustrated act downwardly thereon at the area of coupling and effectively place the abutting ends of the side rails in compression and the loops 29 joining the pins 25 in tension. By virtue of the moment arm defined substantially by the vertical distance between the rails 33, 35 and the pins 25, the supporting strength exhibited by the loops 29 engaging the pins 25 is substantially greater than it would be were the pins 25 adjacent the rails 33, 35, the increase being in direct relation to the length of this moment arm.

The other ends of the chassis 11, 13 are supported by the tractor fifth wheel 19 and the wheel bogies 15, 17 respectively, and consequently the loads at these ends are relatively light so that the truss reinforcement need not be extended to these ends. This is particularly advantageous since the forward end of the chassis 11 can extend substantially over the tractor 21 and the trusssses 43, 45 pose no obstruction to the tractor frame or the fifth wheel 19 no matter which end of the coupled unit is attached to the tractor.

To assist in aligning the chassis 11, 13 and providing greater strength to resist failure under inertia forces, a projecting male member 55 is secured to a plate 57, in turn welded or otherwise suitably fixed to the lowermost end of the tubular member 47 of each truss 45 on the chassis 11, 13. A complementary shaped female member 59 is secured to a plate 61 similarly fixed to the tubular member 47 of each truss 43 on the chassis 11, 13. When the chassis 11, 13 are brought together in aligned abutting relation, as shown in the figures, the male members 55 are snugly received in a corresponding one of the female members 59 and the chassis 11, 13 are held in accurate alignment and are prevented from moving relative to each other in a transverse plane. For added rigidity here, the female member 59 is secured to the adjacent strut 51 as by welding and the plates 57, 61 have angled upper portions 63, 65 positioned to engage adjacent ones of the struts 51 to prevent the plates 57, 61 from bending when the chassis 11, 13 are coupled together.

A substantially identical but reversed male and female member arrangement is provided adjacent the confronting ends of the chassis frame side rails 33, 35. Thus, a plate 63 is suitably fixed to the rear end of each side rail 33 and a plate 65 is similarly fixed to the rear end of each side rail 35. Each of the plates 63 is provided with a projecting male member 67 adapted to snugly fit into a complementary shaped female member 69 secured to each of the plates 65 when the chassis 11, 13 are brought together in coupled relation to further insure alignment and prevent any transverse movement therebetween. Each of the plates 63, 65 seats solidly against the rails 33, 35, respectively, to provide a secure mounting therefor.

Thus, this construction together with the chassis ties 27 results in an extremely simple coupling arrangement capable of easy and rapid assembly and disassembly. At the same time, this coupling arrangement together with the truss construction described above affords a coupled chassis unit capable of withstanding the inertia forces inflicted thereon and eliminates any danger of failure during use.

The chassis 11, 13 are adapted to receive one or more shipping containers 71 thereon and the chassis 11, 13 each may be provided with tie-down devices 73 adjacent each upper corner thereof for securely holding the containers 71 in place. These tie-downs preferably are of the type illustrated and described in detail in the U.S. Patent to R. T. Fujioka et al., No. 3,111,341, issued Nov. 19, 1963, and owned by the assignee of the present application. Thus, the chassis frames 31 can be constructed according to the maximum legal width since the use of the tie-downs 73 obviates the need for heavy and bulky outriggers positioned laterally beyond the chassis frames 31.

Another feature of the present invention is the versatility it affords for the trailer suspension system. Thus, both the wheel bogies 15, 17 and the support legs 21, 23 illustrated are provided with bolster units 75 having clamp members 77 secured thereto and adapted to ride along a guide rail 79 integral with or suitably fixed to the chassis frame side rails 33, 35 and inboard thereof. Since the side rails 33, 35 extend the full length of the chassis 11, 13, the bogies 15, 17 and the support legs 21, 23 can be positioned therealong at virtually any desired location and are easily removable and replaceable, if desired. Furthermore, the wheel bogies 15, 17 and the support legs 21, 23 are wholly inboard the chassis 11, 13 thereby allowing the chassis to be made to the maximum allowable width.

Thus, by the present invention there has been provided a sturdy, highly efficient and extremely simple chassis coupling construction calculated to fulfill the aforementioned objects and while a preferred embodiment of the present invention has been illustrated and described in detail above, various additions, substitutions, modifications and omissions may be made thereto without departing from the spirit of the invention as encompassed by the appended claims.

What is claimed is:

1. In combination with a pair of aligned end-to-end abutted trailer chassis, each having a depending truss means on each side thereof extending to said rear ends, a coupling device for said chassis comprising a first pair of parallel pins on each side edge of each said chassis adjacent said rear ends thereof, a second pair of parallel pins on the bottom of each said truss means adjacent the rear ends of said chassis, a loop engaging each pair of pins on opposite faces thereof for securing said chasis together, two pairs of cooperating male and female members on opposite sides of each said chassis at the rear ends thereof interengaging when said chassis are in aligned abutting relation, said chassis adapted to adjustably receive suspension means along their length.

2. The combination as set forth in claim 1 wherein said chassis include recess means substantially wholly receiving said first pair of pins.

3. The combination as set forth in claim 1 wherein one pair of male and female members on each sde of said chassis is mounted on said chassis and the other pair of male and female members on each side of said chassis is mounted on said dependent trusses adjacent the bottom thereof.

4. The combination as set forth in claim 1 wherein one pair of male and female members on each side of said chassis comprises a male member secured to one of said chassis and a female member secured to the other of said chassis and wherein the other pair of male and female members on each side of said chassis comprises a female member secured to said one chassis and a male member secured to said other chassis.

5. The combination as set forth in claim 1 wherein said chassis each includes elongated guide rail means inboard thereof, wheel bogey and support leg means each including clamp means adapted to be secured in adjusted positions along the length of said guide rail means.

References Cited by the Examiner

UNITED STATES PATENTS

| | | | |
|---|---|---|---|
| 2,912,253 | 11/1959 | Harris | 280—106 |
| 3,086,673 | 4/1963 | Tantlinger et al. | 220—1.5 |
| 3,102,738 | 9/1963 | De Roshia | 280—415 |
| 3,105,703 | 10/1963 | Rittenhouse | 280—415 |
| 3,111,341 | 11/1963 | Fujioka | 296—35 |
| 3,144,141 | 8/1964 | Tantlinger et al. | 214—10.5 |
| 3,288,492 | 11/1966 | Stricker et al. | 280—415 |

LEO FRIAGLIA, *Primary Examiner.*